United States Patent
Domingues et al.

(10) Patent No.: US 12,137,700 B2
(45) Date of Patent: Nov. 12, 2024

(54) FOOD SAFETY METHOD

(71) Applicant: General Mills, Inc., Minneapolis, MN (US)

(72) Inventors: David J Domingues, Plymouth, MN (US); Steven R Pretzel, Lakeville, MN (US); Yuewei Hu, Plymouth, MN (US); Craig A Dowd, Eagan, MN (US); James P Michaels, Blaine, MN (US)

(73) Assignee: General Mills, Inc., Minneapolis, MN (US)

( * ) Notice: Subject to any disclaimer, the term of this patent is extended or adjusted under 35 U.S.C. 154(b) by 213 days.

(21) Appl. No.: 17/834,297

(22) Filed: Jun. 7, 2022

(65) Prior Publication Data

US 2022/0295807 A1 Sep. 22, 2022

Related U.S. Application Data

(62) Division of application No. 16/607,279, filed as application No. PCT/US2018/029099 on Apr. 24, 2018, now Pat. No. 11,632,964.

(60) Provisional application No. 62/489,245, filed on Apr. 24, 2017.

(51) Int. Cl.
  *A23B 9/26* (2006.01)
  *A01N 37/36* (2006.01)
  *A23B 9/02* (2006.01)

(52) U.S. Cl.
  CPC ............... *A23B 9/26* (2013.01); *A01N 37/36* (2013.01); *A23B 9/02* (2013.01)

(58) Field of Classification Search
  CPC ....................................................... A23B 9/26
  See application file for complete search history.

(56) References Cited

U.S. PATENT DOCUMENTS

| | | |
|---|---|---|
| 6,887,509 B2 | 5/2005 | Leusner et al. |
| 2003/0206996 A1 | 11/2003 | Leusner et al. |
| 2008/0044528 A1* | 2/2008 | Porro ............ A23L 7/198 426/257 |
| 2014/0099421 A1 | 4/2014 | Zhao et al. |

FOREIGN PATENT DOCUMENTS

| | | |
|---|---|---|
| GB | 1504114 | 3/1978 |
| JP | S5942852 | 3/1984 |

OTHER PUBLICATIONS

Sabillon et al., "*Reduction in Microbial Load of Wheat by Tempering with Organic Acid and Saline Solutions*", Cereal Chemistry, vol. 93, No. 6, pp. 638-646, 2016.
Kumar et al., "*Inactivation of Escherichia Coli O157:H7 and Salmonella on Mung Beans, Alfalfa, and Other Seed Types Destined for Sprout Production by Using an Oxychloro-Based Sanitizer*", Journal of Food Protection, vol. 69, No. 7, pp. 1571-1578, 2006.
Robinson et al., "*The Conditioning of Wheat. The Influence of Conditioning Temperature on Flour Yield, Moisture Content and Colour*", Journal of the Science of Food and Agriculture, vol. 35, pp. 1340-1346, 1984.
Amado et al., "*Optimization of Antimicrobial Combined Effect of Organic Acids and Temperature on Foodborne Salmonella and Escherichia Coli in Cattle Feed by Response Surface Methodology*", Foodbourne Pathogens and Disease, vol. 10, No. 12, pp. 1030-1036, Nov. 12, 2013.
Oulkheir et al., "*Antimicrobial Effect of Citric, Acetic, Lactic Acids and Sodium Nitrite Against Escherichia Coli in Tryptic Soy Broth*", Journal of Biology, vol. 5, No. 3, pp. 12-20, 2015.
Ye-Won et al., "*Antimicrobial Activities of Acetic Acid, Citric Acid and Lactic Acid against Shigella Species*", Journal of Food Safety, Vo. Ss, Issue 1, Abstract, Jan. 25, 2013.
Brekke, "*Corn Dry Milling: Stress Crack Formation in Tempering of Low-Moisture Corn and Effect of Degerminator Performance*", Cereal Chemistry, vol. 45, No. 4, pp. 291-303, Jul. 1, 1968.

\* cited by examiner

*Primary Examiner* — Rei Tsang Shiao
(74) *Attorney, Agent, or Firm* — Jordan IP Law, LLC; Rachel A. Kahler

(57) ABSTRACT

Methods for inoculating a grain suitable for use in testing methods of reducing bacterial load are disclosed. Also disclosed are methods of reducing bacterial load on a grain by using elevated temperature and an organic acid. Also disclosed are methods of tempering a grain at an elevated temperature and reduced time as compared to standard tempering methods.

16 Claims, 9 Drawing Sheets

FOOD SAFETY METHOD

CROSS-REFERENCE TO RELATED APPLICATIONS

This application represents a divisional application of U.S. patent application Ser. No. 16/607,279 entitled "Food Safety Method" filed Oct. 22, 2019, pending, which represents a National Stage application of PCT/US2018/029099 originally entitled "Food Safety Method", filed Apr. 24, 2018, which claims the benefit of U.S. Provisional Application Ser. No. 62/489,245, filed Apr. 24, 2017. The entire content of these applications is incorporated herein by reference.

BACKGROUND

Raw flour can pose a risk of food-borne illness to consumers that eat it raw. While most bacteria remaining on flour cause little, if any, illness in consumers, some virulent bacteria can occasionally contaminate flour. Shiga toxin producing *E. coli* (STEC)-associated illness is mainly associated with undercooked beef, but is occasionally found in other agricultural products, such as fresh produce and flour. It is thought that STEC is transferred to crops from the soil directly, or by rain or irrigation splash transfer from the soil, cattle manure used as fertilizer, or water contaminated from cattle-producing facilities nearby crops. The STEC can adapt to survival on the growing crops, and contaminate uncooked products, such as flour, produced from them.

Although plant parts used to make flour are generally cleaned of impurities to reduce risk to human health, there remains some contamination by bacteria. Whole grain flours are particularly problematic, since the surface of the grain is not smooth, and bacteria can be harbored in the crease of the grain, as well as any other crevices and cracks on the surface, which are then mixed into the flour upon milling. Bacteria remaining in flour is normally killed when the flour, as a raw ingredient, is cooked. However, raw flour is sometimes misused by the consumer and is consumed alone or in uncooked foods, such as uncooked dough.

SUMMARY

The present disclosure relates to methods of treating a grain to reduce bacterial load.

Methods of reducing bacterial load on grain are provided herein. A method provided herein can include incubating a mixture including the grain and an organic acid solution for a time and temperature sufficient to provide at least a 3 log reduction in an inoculated grain of the same type.

In some embodiments, a method of reducing bacterial load on grain can include an organic acid solution in the mixture in an amount sufficient to provide an organic acid content of at least about $1.5 \times 10^{-5}$ moles per gram grain and a moisture content to the mixture of from 12% to 20%.

In some embodiments, a method of reducing bacterial load on grain can include an organic acid solution having a concentration of organic acid of from 1.5% to 15%.

In some embodiments, a method of reducing bacterial load on grain can include a step of preheating the grain prior to incubation with the organic acid solution.

In some embodiments, a method of reducing bacterial load on grain can include incubating for at least 3 hours at a temperature of at least 100° F.

In some embodiments, a method of reducing bacterial load on grain can include incubating for at least 1 hour at a temperature of from 110° to about 170° F.

In some embodiments, a method of reducing bacterial load on grain can include the use of lactic acid as the organic acid.

In some embodiments, a method of reducing bacterial load on grain can be performed during tempering of the grain.

Methods of preparing inoculated grain are also provided. A method of preparing inoculated grain can include applying a sufficient amount of a log phase inoculation culture to the grain to arrive at a mixture having a moisture content of from 20% to 30%, agitating the mixture sufficiently to evenly distribute the inoculation culture over the grain, and drying the agitated mixture at a temperature of from 65° F. to 80° F. for sufficient time to achieve a moisture content of less than 15% to produce the inoculated grain. In some embodiments, the drying step reduces the moisture content of the inoculated grain to a moisture content of less than 12%.

In some embodiments, a log phase inoculation culture used in a method of preparing an inoculated grain can have a concentration of from $10^6$ to $10^{10}$ CFU/ml.

In some embodiments of a method of preparing an inoculated grain, the agitating step can be performed over a period of from 1 hours to 5 hours.

In some embodiments of a method of preparing an inoculated grain, the drying step can reduce the moisture content of the inoculated grain to a moisture content of less than 12%.

In some embodiments of a method of preparing an inoculated grain, the inoculated grain can have a bacterial load of at least $10^4$ CFU/g grain.

In some embodiments, a log phase inoculation culture used in a method of preparing an inoculated grain can contain at least one strain of *E. coli*.

In some embodiments, a log phase inoculation culture used in a method of preparing an inoculated grain can contain at least one *Salmonella* strain.

Also provided herein are methods of testing treatments for effect on bacterial load on grain. A method of testing treatments for effect on bacterial load on grain can include providing an inoculated grain, exposing the inoculated grain to treatment to be tested, and enumerating bacteria on treated grain.

Also provided herein are methods of tempering a grain. A method of tempering grain provided herein can include heating the grain in the absence of a tempering solution to a temperature of from 115° F. to 150° F., adding sufficient tempering solution to arrive at a moisture content of 12% to 20% to produce a tempering mixture, and incubating the tempering mixture at 115° F. to 170° F. for sufficient time to achieve a tempered grain.

In some embodiments of a method of tempering grain, the tempering solution includes an organic acid.

In some embodiments of a method of tempering grain, the incubation time is less than 6 hours.

In some embodiments of a method of tempering grain, the incubation time is less than 2 hours.

In some embodiments of a method of tempering grain, the grain can be wheat.

Also provided herein are methods of producing a flour. A method of producing a flour provided herein can include heating the grain in the absence of a tempering solution to a temperature of from 115° F. to 150° F., adding sufficient tempering solution to arrive at a moisture content of 12% to 20% to produce a tempering mixture, incubating the tempering mixture at 115° F. to 170° F. for sufficient time to achieve a tempered grain, and milling the tempered grain to produce the flour.

In some embodiments of a method of producing a flour, the tempering solution includes an organic acid.

In some embodiments of a method of producing a flour, the incubation time is less than 6 hours.

In some embodiments of a method of producing a flour, the incubation time is less than 2 hours.

In some embodiments of a method of producing a flour, the grain can be wheat.

These and various other features and advantages will be apparent from a reading of the following detailed description.

DETAILED DESCRIPTION

Figure 1:
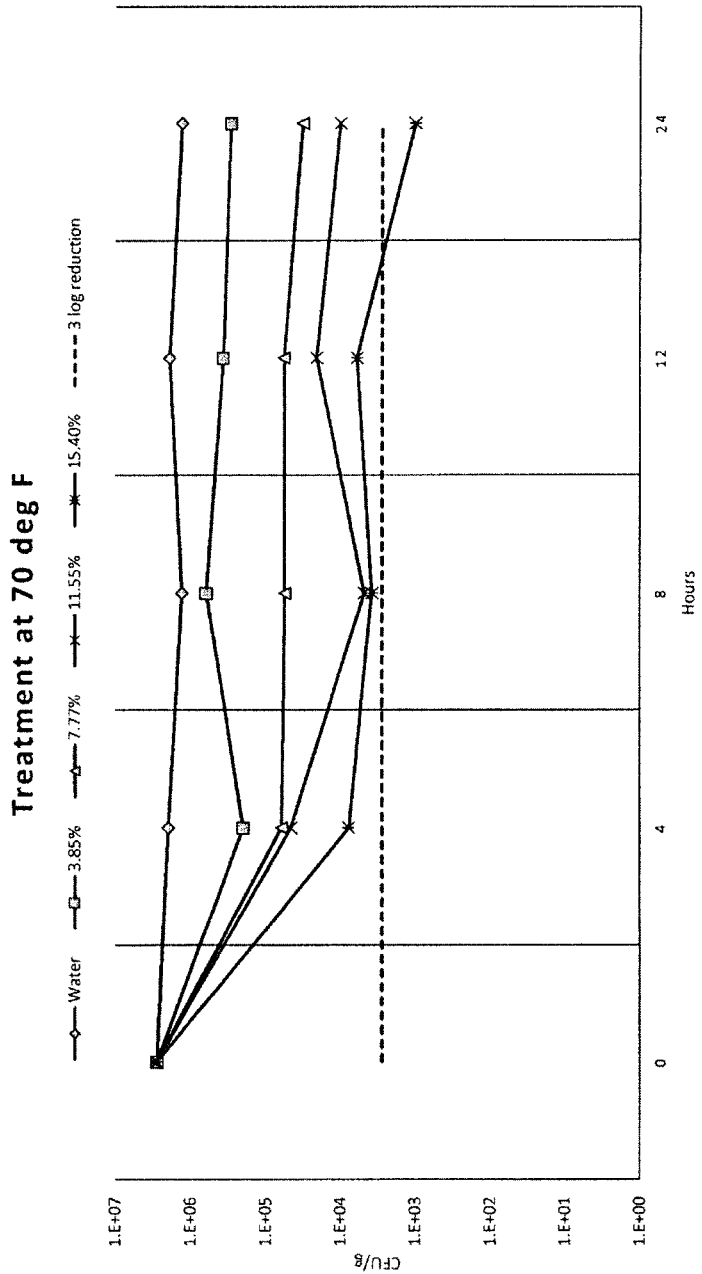
FIG. 1 shows a graph of bacterial load as a function of time and organic acid concentration at 70° F. The dotted line represents the experimental 3 log reduction threshold.
Figure 2:
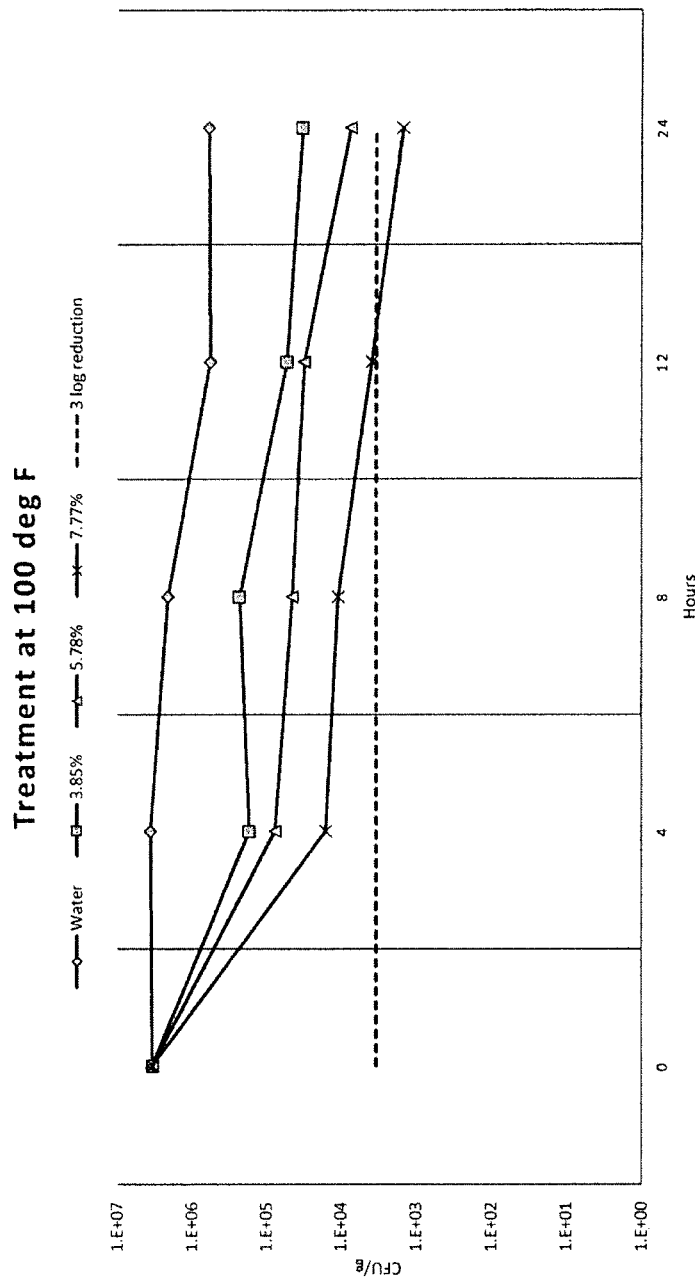
FIG. 2 shows a graph of bacterial load as a function of time and organic acid concentration at 100° F. The dotted line represents the experimental 3 log reduction threshold.
Figure 3:
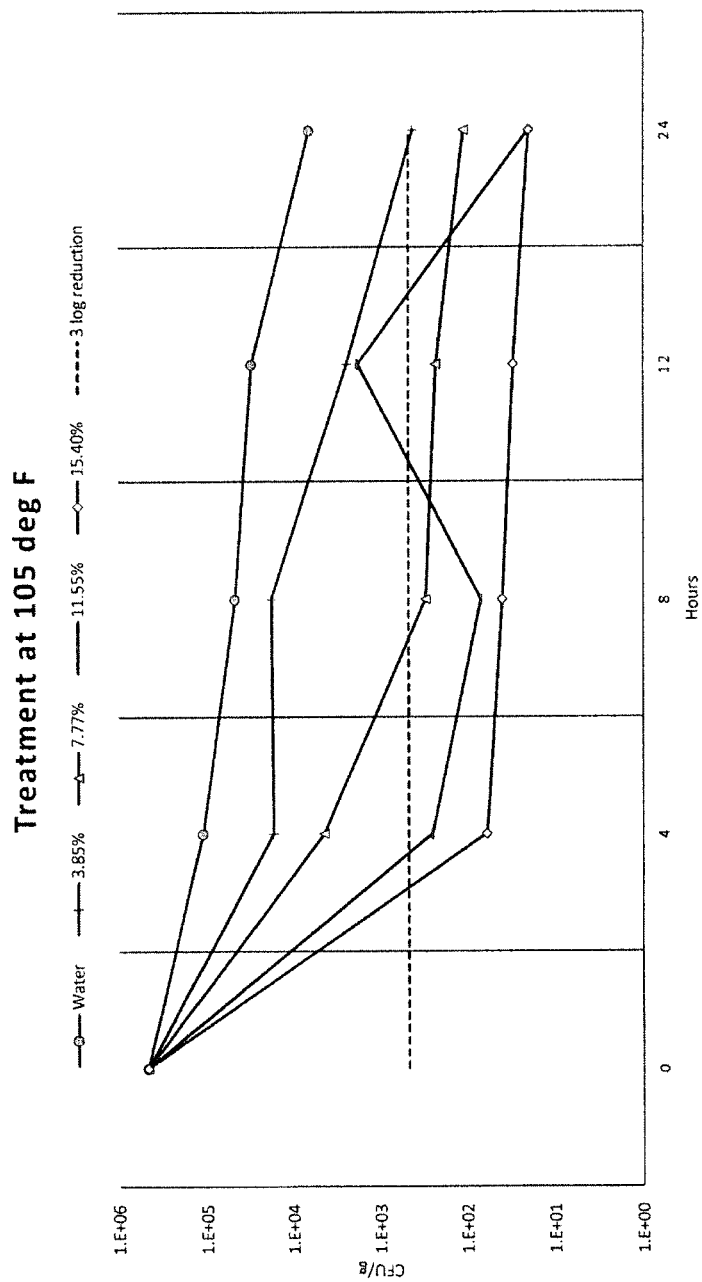
FIG. 3 shows a graph of bacterial load as a function of time and organic acid concentration at 105° F. The dotted line represents the experimental 3 log reduction threshold.
Figure 4:
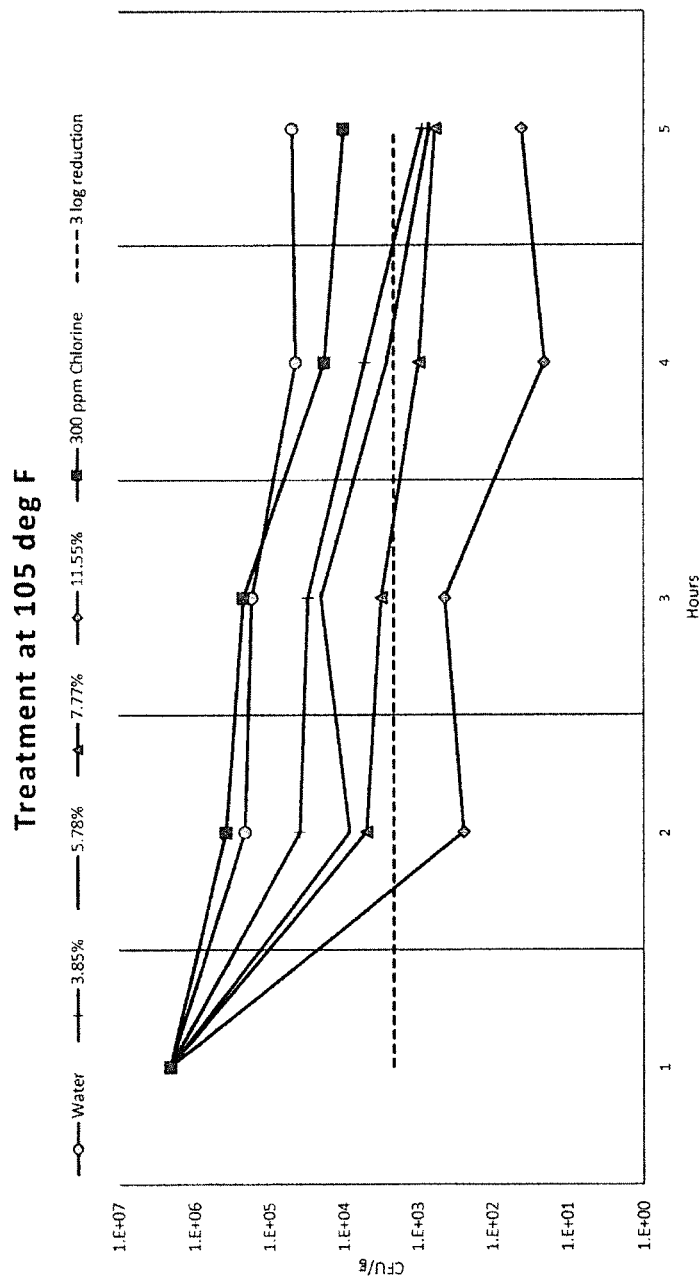
FIG. 4 shows a graph of bacterial load as a function of time and organic acid concentration at 105° F. The dotted line represents the experimental 3 log reduction threshold.
Figure 5:
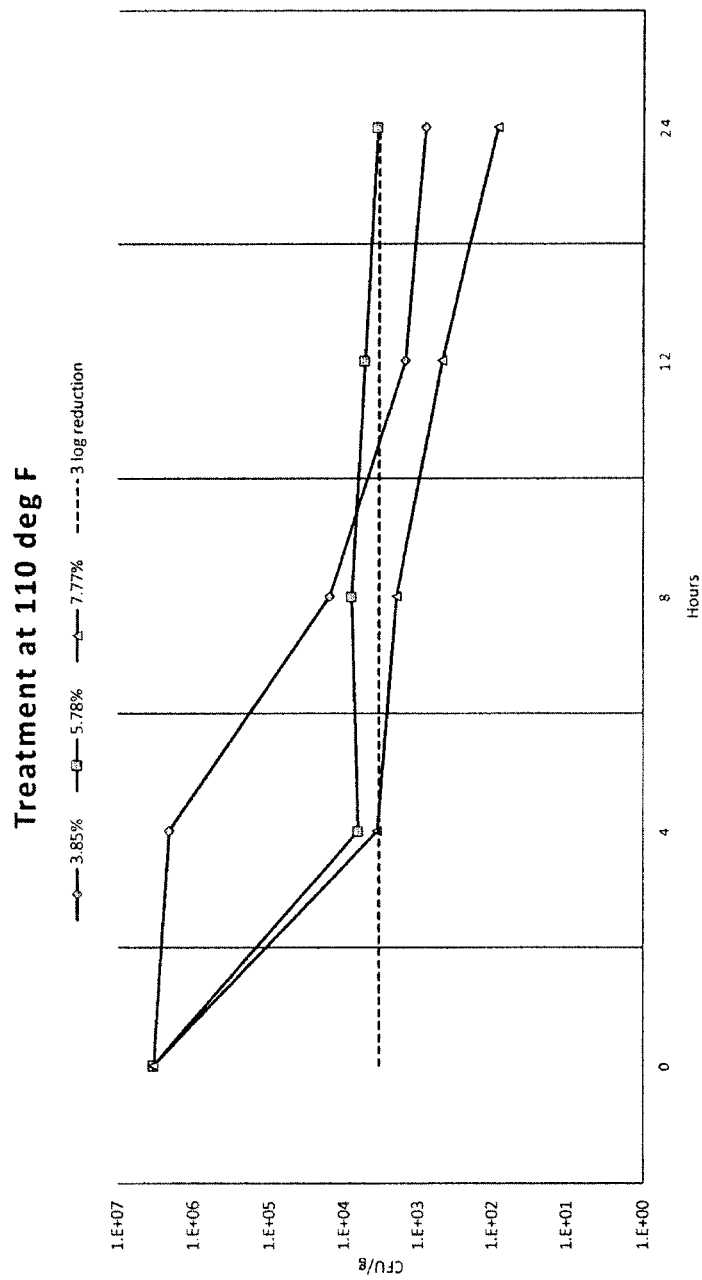
FIG. 5 shows a graph of bacterial load as a function of time and organic acid concentration at 110° F. The dotted line represents the experimental 3 log reduction threshold.
Figure 6:
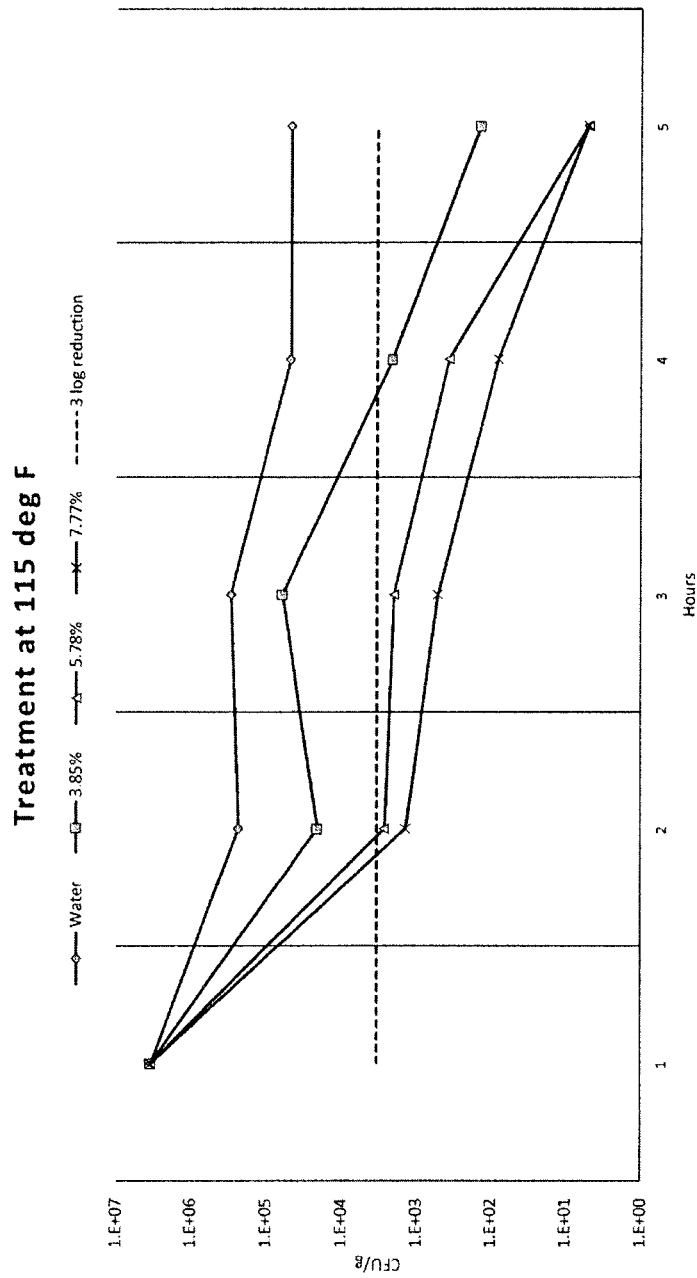
FIG. 6 shows a graph of bacterial load as a function of time and organic acid concentration at 115° F. The dotted line represents the experimental 3 log reduction threshold.
Figure 7:
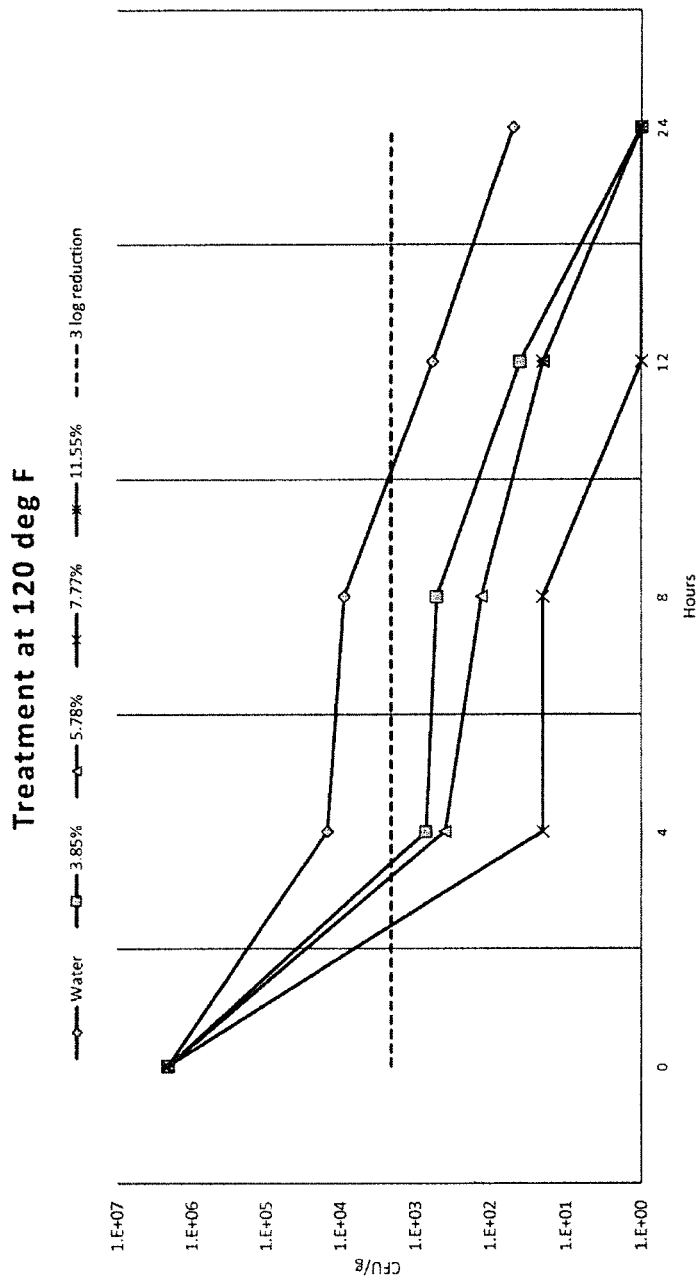
FIG. 7 shows a graph of bacterial load as a function of time and organic acid concentration at 120° F. The dotted line represents the experimental 3 log reduction threshold.

Flour is a raw food ingredient made from milling plant parts, such as grain, that are grown outdoors where bacteria are often present. Although bacteria remaining in flour is normally killed when the flour is cooked, sometimes consumers ingest uncooked flour intentionally or unintentionally. While most consumers may never suffer illness as a result of consuming raw flour, the occasional illness resulting from eating raw flour can sometimes be serious. Efforts to further improve safety of flour were undertaken in order to reduce risk of illness from consumption of flour while retaining important functional aspects of the flour.

In an effort to further reduce risk to human health from flour, a technique for testing survival of a bacterial inoculant on whole grain was discovered, and is disclosed herein. This discovery made it possible to experimentally test the effects of treatment on bacterial load on grain.

It was further discovered, and is disclosed herein, that treatment of whole grain with an organic acid and elevated temperature can produce at least a 3 log reduction in STEC contamination, without significantly changing the function of the proteins (e.g., gluten) or starch in flour made with the treated whole grain. This is particularly surprising since STEC are understood to be low pH tolerant and be tolerant of broad temperature conditions.

An additional discovery disclosed herein, is that the time needed to temper a grain can be reduced to less than 6 hours (e.g., less than 3 hours, less than 2 hours, or to 1 hour). Tempering is a method of treating grain that prepares the grain for milling and helps produce consistent results when using a milled grain product. Generally, tempering includes adding moisture to a grain before milling. A tempering solution, typically water or water with chlorine (up to about 300 ppm), or in the case of a method of reducing bacterial load on a grain provided herein, water with an organic acid, is generally added to a grain and allowed to distribute into the grain. The process can improve milling characteristics of the grain by altering the bran such that it will remain in larger pieces when milled, and making it easier to separate from the endosperm. In addition, tempering can make the moisture content of milled grain products consistent, which allows for greater predictability in the behavior of milled grain products when used to make other products, such as flour. Tempering typically takes at least 6 hours for softer grains, such as soft wheat, to more than 24 hours for harder grains, such as hard wheat. It was discovered that, by preheating a grain prior to the addition of a tempering solution and a heated incubation time, tempering can be done in less than 6 hours, less than 2 hours, or 1 hour, or less.

Inoculated Grain

A new method of preparing an inoculated grain is provided herein. In some embodiments, the method includes applying a sufficient amount of a log phase inoculation culture to a grain (e.g., wheat, oat, barley, or the like) in order to arrive at a mixture that has a moisture content of from 20% to 30% (e.g., from about 22% to about 27%, or from about 24% to about 25%), agitating the mixture sufficiently to evenly distribute the inoculation culture over the grain, and drying the agitated mixture to arrive at an inoculated grain. Moisture content of a grain, grain mixture, or inoculated grain described herein can be measured by grinding the grain and measuring moisture content using a moisture analyzer (e.g., Metler Toledo HB43-S moisture analyzer).

In some embodiments, a method of preparing inoculated grain includes applying a sufficient amount of a log phase inoculation culture to a grain having a moisture content of 5-8% to arrive at a mixture having a moisture content of from 9% to 13%, and agitating the mixture sufficiently to evenly distribute the inoculation culture over the grain to arrive at an inoculated grain. Moisture content of a grain, grain mixture, or inoculated grain described herein can be measured by grinding the grain and measuring moisture content using a moisture analyzer (e.g., Metler Toledo HB43-S moisture analyzer).

An inoculated grain provided herein can have a stable bacterial load during storage. For example, an inoculated grain provided herein can have a bacterial load varies by no more than 3 log over a storage time of at least 30 days at 70° F. in a sealed container. In some embodiments, an inoculated grain provided herein can have a bacterial load that does not fall below a desired threshold (e.g., $10^5$ CFU/g grain or $10^4$ CFU/g grain) over a storage time of at least 30 days at 70° F. in a sealed container.

As used herein, a "log phase inoculation culture" is a liquid culture containing one or more strains of logarithmically growing bacteria. A log phase inoculation culture includes any appropriate bacterial species for testing bacterial survival on grain. Although virulent strains of bacteria can be used, non-virulent representative strains may be preferable. For example, if STEC bacteria are to be used, attenuated strains can be used instead of virulent strains of STEC, such as O121, O157:H7, O26:H4, O103:K:H8, and O111a, 111b:K58:H21. In another example, if *Salmonella* bacteria are to be used, strains such as American Type Culture Collection (ATCC, Manassas, VA, USA) accessions ATCC #51741, ATCC #51957, ATCC #BAA-707, ATCC #BAA-2568, and ATCC #9268 can be used.

A log phase inoculation culture can be made using any appropriate technique. An example includes inoculating a liquid bacterial medium (e.g., brain heart infusion medium, tryptic soy broth, and/or other selective or non-selective broth) with a colony from a solid bacterial medium (e.g., MacConkey agar, sorbitol-MacConkey agar, plate count agar, and/or other selective or non-selective medium), and allowing the bacteria to grow in the liquid medium in appropriate conditions (e.g., incubation at about 37° C.) until logarithmic phase growth is reached. In some embodiments, a liquid medium can be inoculated using bacteria from a liquid culture. Methods for inoculating and incubating a liquid culture can be combined to arrive at a desired log phase inoculation culture.

In some embodiments, multiple bacterial strains can be grown together in a liquid culture to reach log phase. However, in order to reduce competition of bacteria in mixed cultures, in some embodiments, different bacterial strains can be grown separately to log phase before combining into a single log phase inoculation culture.

A log phase inoculation culture can contain from about $10^6$ to about $10^{10}$ (e.g., from about $10^7$ to about $10^9$, or about $10^8$) colony forming units (CFU) per ml of liquid culture. Colony forming units per ml can be determined using any appropriate method, such as by measuring optical density of the culture or by counting cells by flow cytometry.

The amount and concentration of a log phase inoculation culture applied to grain can be adjusted as desired to result in an inoculated grain that has the desired bacterial load. A suitable bacterial load of an inoculated grain provided herein can be at least $10^3$ CFU/g grain (e.g., at least $10^4$ CFU/g grain, or from $10^5$ to $10^9$ CFU/g grain, or from about $10^5$ to about $10^7$ CFU/g grain). Bacterial load on an inoculated grain can be enumerated using any appropriate method. For example, bacterial load can be measured by adding grain to a dilution buffer and agitating the mixture. The buffer can then be serially diluted (e.g., dilutions from $10^{-1}$ to $10^{-6}$) and plated on to an agar plate or film. Agar plates or films can then be incubated at a temperature appropriate for the bacteria to be enumerated (e.g., 32-37° C. for STEC bacteria), and bacterial colonies enumerated after an appropriate incubation period (e.g., 18-24 hours).

In a method of preparing an inoculated grain provided herein, following application of a log phase inoculation culture to a grain, the mixture can be agitated using any appropriate means (e.g., stirring, shaking, vibration, tumbling, or the like) for sufficient time to evenly distribute the log phase inoculation culture throughout the grain. For example, a log phase inoculation culture and a grain can be combined in a container, which is then shaken periodically over several hours to evenly distribute the log phase inoculation culture throughout the grain.

A method of preparing an inoculated grain further includes drying a mixture of log phase inoculation culture and grain that has been agitated to evenly distribute the inoculation culture throughout the grain. Drying can be done at a temperature of from 60° F. to 85° F. (e.g., 65° F. to 80° F.) for sufficient time to achieve an inoculated grain having a moisture content of less than 15% (e.g., less than 13%, or less than 12%).

Any appropriate drying method can be used to produce an inoculated grain. For example, a mixture of log phase inoculation culture and grain that has been agitated to evenly distribute the inoculation culture throughout the grain can be spread out on trays and dried at ambient conditions. In another example, a mixture of log phase inoculation culture and grain that has been agitated to evenly distribute the inoculation culture throughout the grain can be dried in an oven. In some embodiments, drying can be done using multiple methods and/or in multiple stages. For example, a mixture can be dried in ambient conditions for some period of time, followed by drying in an oven or drying by evaporation (e.g., by placing in a ventilated hood).

In some embodiments, an inoculated grain provided herein retains substantially all of the structural and functional characteristics of the grain before inoculation. For example, an inoculated grain can retain substantially the same gross structural characteristics, as well as substantially the same protein content and functionality, and starch content and functionality, as before inoculation.

Methods of Reducing Bacterial Load

An inoculated grain provided herein can be used to test the effect of a treatment on bacterial load of a grain. A method for testing a treatment for its effect on bacterial load on grain includes exposing an inoculated grain to the treatment to be tested, and enumerating bacteria on the grain as described above.

It was discovered that, by using an inoculated grain provided herein, the effect of an organic acid on bacterial load, as well as incubation temperature could be tested. It was further discovered that a combination of an organic acid (e.g., lactic acid, citric acid, or salicylic acid) and an incubation time at a range of temperatures can be used to reduce bacterial load on a grain. It is believed that a method of reducing a bacterial load on a grain provided herein can be used to reduce the risk of bacterial contamination of grain prior to milling and/or use of the grain in foods. In some embodiments, a method of reducing bacterial load on grain provided herein can be used during, or in addition to, tempering of the grain (e.g., using American Association of Cereal Chemists (AACC) method 26-95.01).

In some embodiments, a method of reducing bacterial load on a grain provided herein can be sufficient to reduce bacterial load by at least 3 log (e.g., at least 4 log, or at least 5 log) on an inoculated grain. A grain treated using a method of reducing bacterial load provided herein need not actually experience a 3 log reduction in bacterial load, so long as the treatment is sufficient to do so on an inoculated grain provided herein.

In some embodiments, a method of reducing bacterial load on a grain can include adding an organic acid solution to the grain in an amount sufficient to provide a mixture having at least $1.5\times10^{-5}$ (e.g., $1.5\times10^{-5}$ to $1\times10^{-4}$) moles acid per gram grain, and a moisture content of from about 12% to about 20% (e.g., from about 14% to about 18%). An organic acid solution used in a method provided herein can include any appropriate concentration of an organic acid, such as lactic acid, peracetic acid, acetic acid, citric acid, or salicylic acid. For example, a 1.5% to 10% (e.g., about 2% to about 8%) lactic acid solution can be used in a method provided herein. Since the amount of moisture added to a grain can vary depending on the initial moisture content of the grain and the desired moisture content once the grain is tempered, an amount of organic acid can be added as an amount by weight of the grain treated. For example, an organic acid, such as lactic acid, can be added in an amount of 0.6 g to 2 g (e.g., from about 0.625 g/to 1.875 g) per pound of grain.

In some embodiments, a method of reducing bacterial load on a grain includes incubating a mixture of an organic acid solution and grain at a temperature between 70° F. and 170° F. (e.g., from about 120° F. to about 150° F., or from about 120° F. to about 140° F.) for sufficient time to reduce the bacterial load by at least 2 log (e.g., at least 3 log, at least 4 log, or at least 5 log). It is to be understood that a higher temperature and/or higher organic acid concentration can reduce the time sufficient to reduce the bacterial load. Conversely, a longer time combined with a lower temperature and/or lower organic acid concentration can be sufficient to achieve a 3 log reduction. Lactic acid is particularly effective in a method of reducing bacterial load on a grain, however it is to be understood that a higher temperature and/or higher organic acid concentration can be used to supplement a method using a less effective organic acid. Preferably, the combination of time, temperature, and acid content used in a method of reducing bacterial load does not significantly affect the functionality of the grain following treatment. For example, a flour made from a treated grain should function in substantially the same way as a grain that has not been treated.

A method of reducing bacterial load on a grain need not be a continuous process, and the incubation temperature need not be constant. For example, a total exposure time and temperature at a particular organic acid concentration can be calculated as being sufficient to reduce bacterial load by at least 3 log, and so long as the total exposure time, temperature and organic acid concentration are met, the treatment can still be considered sufficient to reduce the bacterial load by at least 3 log. This can be particularly useful if a method of reducing bacterial load is performed as part of a tempering treatment of the grain, since tempering times and temperatures can vary during the tempering process.

In some embodiments, a method of reducing bacterial load provided herein may be desired to result in reducing bacterial load by at least 3 log within 4 hours of application of an organic acid. In some embodiments, a method of reducing bacterial load provided herein can take from 4-24 hours (e.g., 8-24 hours) to be sufficient to reduce the bacterial load by at least 3 log. In some embodiments, a 3 log reduction can be achieved within 1 hour of treatment (e.g., at about 125° F. to about 140° F. with from about 0.6 g to about 2 g lactic acid per pound of grain).

Any appropriate equipment can be used in a method of reducing bacterial load on a grain. For example, grain storage, mixing, and heating equipment can be used. In some embodiments, in order to reduce damage to equipment used in a method of reducing bacterial load, equipment that comes in contact with an organic acid can have contact surfaces that include materials that are resistant to acid damage, such as stainless steel.

Accelerated Grain Tempering

Methods of accelerating tempering a grain are also provided. A method for tempering a grain includes preheating the grain prior to addition of a tempering solution. A grain can be preheated to a temperature of at least 115° F. (e.g., from 115° F. to about 170° F., from about 120° F. to about 150° F., or from about 120° F. to about 140° F.). In some embodiments, a preheating step is performed on grain having a moisture content of from 10% to 12%. Preheating a grain can be followed by addition of a tempering solution immediately upon the grain reaching an average temperature of at least 115° F. (e.g., about 115° F. to about 170° F., from about 120° F. to about 140° F., or about 125° F.), or the grain can be held at the preheat temperature for any appropriate time (e.g., several minutes up to several hours) before the addition of a tempering solution.

A tempering solution, preheated to about the temperature of the preheated grain to which it will be added, can be added to a preheated grain in an amount sufficient to arrive at a moisture content of the grain of about 12% to about 20% (e.g., about 14% to about 18%, or about 15%) to produce a tempering mixture. Any suitable tempering solution can be used. However, if it is also desired to reduce bacterial load of the grain, a tempering solution that includes an organic acid described above, or a tempering solution containing an amount of chlorine (e.g., 200 ppm to 300 ppm chlorine), can be used.

A tempering mixture can be incubated at temperature sufficient to produce a tempered grain within 6 hours (e.g., within 3 hours, within 2 hours, or within 1 hour) of producing the tempering mixture. In some embodiments, such as where a tempering solution is used that contains an organic acid, the incubation time and temperature can be sufficient to provide at least a 3 log reduction in an inoculated grain of the same type. The temperature used during the tempering step of an accelerated tempering method provided herein can be the same temperature or a different temperature (i.e., higher or lower) than the preheated temperature of the grain.

In some embodiments, a method of tempering a grain provided herein can also include a step of reducing the temperature of the tempered grain to a temperature below 115° F. (e.g., below 100° F. or below 80° F.).

A tempered grain produced using an accelerated tempering procedure described herein can be used in the same way as a grain that has been tempered using a standard procedure, such as that described in American Association of Cereal Chemists (AACC) method 26-95.01. For example, a grain tempered in a method provided herein can be milled to produce a flour.

The following examples illustrate particular embodiments and are not intended to limit the claimed invention.

EXAMPLES

Example 1—Log Phase Inoculation Culture

Five strains of attenuated STEC shown in Table 1 were obtained from the American Type Culture Collection (ATCC®, Manassas, Virginia, USA) and used to inoculate 10 ml of brain heart infusion (BHI) broth to produce 5 separate starter cultures.

TABLE 1

| ATCC No. | Serotype |
|---|---|
| BAA-2212 | *E. coli* O26:H4 |
| 23982 | *E. coli* O103:K:H8 |
| 29552 | *E. coli* O111a, 111b:K58:H21 |
| BAA-2190 | *E. coli* O121 |
| 43888 | *E. coli* O157:H7 |

The starter cultures were incubated at 37° C. for 24 hours to reach log phase growth. The log phase starter cultures were each streaked onto separate CHROMager™ STEC selective agar plates (CHROMagar™, Paris, France), and incubated at 37° C. for 18-24 hours. Isolated colonies from the STEC selective agar were then streaked onto individual plate count agar (PCA) plates, and incubated at 37° C. for 24 hours. Isolated colonies from the PCA plates were used to inoculate 5 separate samples of 10 ml of BHI broth, which were incubated at 37° C. for 24 hours to log phase growth and an approximate concentration of $10^9$ CFU/ml. 100 μl of each of the BHI broths was used to inoculate 1 L of BHI broth cultures, which were incubated at 37° C. for 24 hours to log phase growth and an approximate concentration of $10^8$ CFU/ml. The 5 1 L BHI cultures were combined to produce a log phase inoculation culture at a concentration of $1.3 \times 10^8$ CFU/ml.

Example 2—Grain Inoculation

The log phase inoculation culture from Example 1 was added to hard red winter (HRW) wheat with a 10% moisture content in a ratio of 192 g log phase inoculation culture to 1 kg wheat to arrive at a moisture content of about 24.6%. The mixture was sealed in a container and shaken vigorously every 30 minutes over 3 hours at room temperature. The wheat was then spread out onto baking trays, and the wheat was allowed to dry at ambient lab conditions (about 70° F. and about 34.5% relative humidity) for 3-5 days prior to double bagging into plastic bags for storage at ambient lab temperature. The moisture content of the wheat at bagging was about 13.8%, and the bacterial load was approximately $1.3 \times 10^8$ CFU/g. Bacteria on the inoculated wheat was enumerated periodically over 30 days. After an initial drop of 1-2 log, the *E. coli* population stabilized on the wheat after 15 days at about $10^6$ CFU/g. Enumeration of bacterial load was performed by adding 11 g wheat to 99 ml dilution buffer, then agitating in a stomacher. The buffer was then serially diluted from $10^1$ to $10^t$ and plated onto a petri film. The petri film was incubated at 32-37° C. and bacterial colonies were enumerated after 24 hours.

To measure the effect of drying on bacterial load, HRW wheat was inoculated as above, but instead of bagging after drying at ambient conditions, the samples were further dried at 70° F. and 20% relative humidity, and sampled for moisture content at 30 minute intervals over a 3 hour period of time in order to more closely approximate the moisture content of wheat typically used for commercial milling. These drying conditions approximate conditions typically encountered at a grain mill. While the moisture content of the wheat was reduced at a rate of about 0.47% moisture per hour, the bacterial load was steady between $10^5$/g and $10^6$/g, indicating that further drying had no significant effect on pathogen population on the inoculated wheat.

Based on these results, it appears as though a grain can be inoculated with STEC bacteria and dried to produce a grain that is stably inoculated with dry-adapted STEC bacteria. It is believed that an inoculated grain can be used as a model for dry-adapted bacteria, particularly STEC, naturally occurring on crops.

Also based on these results, it appears that the initial inoculation rate should be 1-2 log higher than the final desired bacterial load. A final bacterial load of from about $10^4$ to $10^7$ should be sufficient to provide statistical confidence in the effects of tested treatment conditions on bacterial load, though the level of initial bacterial load may be adjusted as desired.

Similar results were obtained using a blend of *Salmonella* strains, including ATCC accessions ATCC #51741, ATCC #51957, ATCC #BAA-707, ATCC #BAA-2568, and ATCC #9268. These results indicate that inoculated grain can be produced using STEC bacteria, as well as other bacteria types, such as *Salmonella*.

Example 3—Effect of Temperature and Organic Acid on Bacterial Load

HRW wheat was inoculated with a 5 strain STEC cocktail, as described in Example 1. The drying procedure was modified to replace the 5 day drying at ambient conditions with 12-24 hours in the sealed container at about 70° F., followed by drying for 3 days at ambient conditions on trays prior to bagging and storage at ambient temperature. The inoculated wheat had a moisture content of 14-15% and bacterial load of about $10^6$ CFU/g.

Samples for testing included 250 g of inoculated wheat in plastic Nalgene containers. The amount of organic acid solution added to each sample was calculated to be 11.78 g of solution per 250 g inoculated wheat to mimic tempering moisture conditions (15% moisture) according to American Association of Cereal Chemists (AACC) method 26-95.01. The organic acid concentrations in % (tempering solution), organic acid concentrations in moles/g wheat, incubation temperatures, and starting bacterial load are provided in Table 2.

TABLE 2

| Treatment | Tempering solution | Moles acid/g wheat | Temperature (° F.) | Starting CFU/g |
|---|---|---|---|---|
| 1 | water | 0 | 70 | $2.8 \times 10^6$ |
| 2 | water | 0 | 105 | $4.7 \times 10^5$ |
| 3 | 3.85% lactic acid | $2.02 \times 10^{-5}$ | 70 | $2.8 \times 10^6$ |
| 4 | 3.85% lactic acid | $2.02 \times 10^{-5}$ | 105 | $4.7 \times 10^5$ |
| 5 | 7.77% lactic acid | $4.03 \times 10^{-5}$ | 70 | $2.8 \times 10^6$ |
| 6 | 7.77% lactic acid | $4.03 \times 10^{-5}$ | 105 | $4.7 \times 10^5$ |
| 7 | 11.55% lactic acid | $6.06 \times 10^{-5}$ | 70 | $2.8 \times 10^6$ |
| 8 | 11.55% lactic acid | $6.06 \times 10^{-5}$ | 105 | $4.7 \times 10^5$ |
| 9 | 15.4% lactic acid | $8.08 \times 10^{-5}$ | 70 | $2.8 \times 10^6$ |
| 10 | 15.4% lactic acid | $8.08 \times 10^{-5}$ | 105 | $4.7 \times 10^5$ |
| 11 | water | 0 | 105 | $2.1 \times 10^6$ |
| 12 | water | 0 | 120 | $2.1 \times 10^6$ |
| 13 | 3.85% lactic acid | $2.02 \times 10^{-5}$ | 105 | $2.1 \times 10^6$ |
| 14 | 3.85% lactic acid | $2.02 \times 10^{-5}$ | 120 | $2.1 \times 10^6$ |
| 15 | 5.78% lactic acid | $3.01 \times 10^{-5}$ | 105 | $2.1 \times 10^6$ |
| 16 | 5.78% lactic acid | $3.01 \times 10^{-5}$ | 120 | $2.1 \times 10^6$ |
| 17 | 7.77% lactic acid | $4.03 \times 10^{-5}$ | 105 | $2.1 \times 10^6$ |
| 18 | 7.77% lactic acid | $4.03 \times 10^{-5}$ | 120 | $2.1 \times 10^6$ |
| 19 | 11.55% lactic acid | $6.06 \times 10^{-5}$ | 105 | $2.1 \times 10^6$ |
| 20 | 11.55% lactic acid | $6.06 \times 10^{-5}$ | 120 | $2.1 \times 10^6$ |
| 21 | 300 ppm chlorine | 0 | 105 | $2.1 \times 10^6$ |
| 22 | water | 0 | 100 | $3.4 \times 10^6$ |
| 23 | water | 0 | 115 | $3.4 \times 10^6$ |
| 24 | 3.85% lactic acid | $2.02 \times 10^{-5}$ | 100 | $3.4 \times 10^6$ |
| 25 | 3.85% lactic acid | $2.02 \times 10^{-5}$ | 110 | $3.4 \times 10^6$ |
| 26 | 3.85% lactic acid | $2.02 \times 10^{-5}$ | 115 | $3.4 \times 10^6$ |
| 27 | 5.78% lactic acid | $3.01 \times 10^{-5}$ | 100 | $3.4 \times 10^6$ |
| 28 | 5.78% lactic acid | $3.01 \times 10^{-5}$ | 110 | $3.4 \times 10^6$ |
| 29 | 5.78% lactic acid | $3.01 \times 10^{-5}$ | 115 | $3.4 \times 10^6$ |
| 30 | 7.77% lactic acid | $4.03 \times 10^{-5}$ | 100 | $3.4 \times 10^6$ |
| 31 | 7.77% lactic acid | $4.03 \times 10^{-5}$ | 110 | $3.4 \times 10^6$ |
| 32 | 7.77% lactic acid | $4.03 \times 10^{-5}$ | 115 | $3.4 \times 10^6$ |

Inoculated wheat samples were incubated for up to 24 hours, and the bacterial loads were measured various time points as shown in Tables 3-9 and graphed in FIGS. 1-7.

TABLE 3

Treatment at 70° F.

| Time (hr) | Treatment | | | | |
|---|---|---|---|---|---|
| | 1 | 3 | 5 | 7 | 9 |
| | CFU/g wheat | | | | |
| 0 | $2.8 \times 10^6$ | $2.8 \times 10^6$ | $2.8 \times 10^6$ | $2.8 \times 10^6$ | $2.8 \times 10^6$ |
| 4 | $2.0 \times 10^6$ | $2.0 \times 10^5$ | $6.2 \times 10^4$ | $4.6 \times 10^4$ | $7.7 \times 10^3$ |
| 8 | $1.3 \times 10^6$ | $6.2 \times 10^5$ | $5.6 \times 10^4$ | $4.8 \times 10^3$ | $3.8 \times 10^3$ |
| 12 | $1.9 \times 10^6$ | $3.7 \times 10^5$ | $5.7 \times 10^4$ | $2.1 \times 10^4$ | $6.0 \times 10^3$ |
| 24 | $1.3 \times 10^6$ | $2.9 \times 10^5$ | $3.2 \times 10^4$ | $1.0 \times 10^4$ | $1.0 \times 10^3$ |

TABLE 4

Treatment at 105° F.

| Time (hr) | Treatment | | | | |
|---|---|---|---|---|---|
| | 2 | 4 | 6 | 8 | 10 |
| | CFU/g wheat | | | | |
| 0 | $4.7 \times 10^5$ | $4.7 \times 10^5$ | $4.7 \times 10^5$ | $4.7 \times 10^5$ | $4.7 \times 10^5$ |
| 4 | $1.1 \times 10^5$ | $1.7 \times 10^4$ | $4.4 \times 10^3$ | $2.5 \times 10^2$ | $6.0 \times 10^1$ |
| 8 | $4.7 \times 10^4$ | $1.8 \times 10^4$ | $3.0 \times 10^2$ | $7.0 \times 10^1$ | $4.0 \times 10^1$ |
| 12 | $3.0 \times 10^4$ | $2.4 \times 10^3$ | $2.3 \times 10^2$ | $1.8 \times 10^3$ | $3.0 \times 10^1$ |
| 24 | $6.5 \times 10^3$ | $4.2 \times 10^2$ | $1.1 \times 10^2$ | $2.0 \times 10^1$ | $2.0 \times 10^1$ |

TABLE 5

Treatment at 105° F.

| Time (hr) | Treatment | | | | | |
|---|---|---|---|---|---|---|
| | 11 | 13 | 15 | 17 | 19 | 21 |
| | CFU/g wheat | | | | | |
| 0 | $2.1 \times 10^6$ | $2.1 \times 10^6$ | $2.1 \times 10^6$ | $2.1 \times 10^6$ | $2.1 \times 10^6$ | $2.1 \times 10^6$ |
| 4 | $2.1 \times 10^5$ | $3.9 \times 10^4$ | $8.3 \times 10^3$ | $4.9 \times 10^3$ | $2.4 \times 10^2$ | $3.8 \times 10^5$ |
| 8 | $1.7 \times 10^5$ | $3.0 \times 10^4$ | $2.0 \times 10^4$ | $3.1 \times 10^3$ | $4.3 \times 10^2$ | $2.2 \times 10^5$ |
| 12 | $4.4 \times 10^4$ | $5.2 \times 10^3$ | $2.6 \times 10^3$ | $9.6 \times 10^2$ | $2.0 \times 10^1$ | $1.8 \times 10^4$ |
| 24 | $4.9 \times 10^4$ | $8.7 \times 10^2$ | $7.0 \times 10^2$ | $5.8 \times 10^2$ | $4.0 \times 10^1$ | $1.0 \times 10^4$ |

TABLE 6

Treatment at 120° F.

| Time (hr) | Treatment | | | | |
|---|---|---|---|---|---|
| | 12 | 14 | 16 | 18 | 20 |
| | CFU/g wheat | | | | |
| 0 | $2.1 \times 10^6$ | $2.1 \times 10^6$ | $2.1 \times 10^6$ | $2.1 \times 10^6$ | $2.1 \times 10^6$ |
| 4 | $1.5 \times 10^4$ | $7.1 \times 10^2$ | $4.0 \times 10^2$ | $2.0 \times 10^1$ | NM* |
| 8 | $8.9 \times 10^3$ | $5.1 \times 10^2$ | $1.3 \times 10^2$ | $2.0 \times 10^1$ | NM |
| 12 | $5.8 \times 10^2$ | $4.0 \times 10^1$ | $2.0 \times 10^1$ | 1 | $2.0 \times 10^1$ |
| 24 | $5.0 \times 10^1$ | 1 | 1 | 1 | 1 |

*NM = not measured

TABLE 7

Treatment at 100° F.

| Time (hr) | Treatment | | | |
|---|---|---|---|---|
| | 22 | 24 | 27 | 30 |
| | CFU/g wheat | | | |
| 0 | $3.4 \times 10^6$ | $3.4 \times 10^6$ | $3.4 \times 10^6$ | $3.4 \times 10^6$ |
| 4 | $3.6 \times 10^6$ | $1.7 \times 10^5$ | $7.7 \times 10^4$ | $1.6 \times 10^4$ |
| 8 | $2.1 \times 10^6$ | $2.3 \times 10^5$ | $4.5 \times 10^4$ | $1.1 \times 10^4$ |

TABLE 7-continued

Treatment at 100° F.

| Time (hr) | Treatment | | | |
|---|---|---|---|---|
| | 22 | 24 | 27 | 30 |
| | CFU/g wheat | | | |
| 12 | $5.7 \times 10^5$ | $5.3 \times 10^4$ | $3.1 \times 10^4$ | $3.9 \times 10^3$ |
| 24 | $6.0 \times 10^5$ | $3.3 \times 10^4$ | $7.5 \times 10^3$ | $1.5 \times 10^3$ |

TABLE 8

Treatment at 110° F.

| Time (hr) | Treatment | | |
|---|---|---|---|
| | 25 | 28 | 31 |
| | CFU/g wheat | | |
| 0 | $3.4 \times 10^6$ | $3.4 \times 10^6$ | $3.4 \times 10^6$ |
| 4 | $2.1 \times 10^6$ | $6.5 \times 10^3$ | $3.6 \times 10^3$ |
| 8 | $1.6 \times 10^4$ | $8.0 \times 10^3$ | $2.0 \times 10^3$ |
| 12 | $1.5 \times 10^3$ | $5.3 \times 10^3$ | $4.8 \times 10^2$ |
| 24 | $8.1 \times 10^2$ | $3.6 \times 10^3$ | $8.5 \times 10^1$ |

TABLE 9

Treatment at 115° F.

| Time (hr) | Treatment | | | |
|---|---|---|---|---|
| | 23 | 26 | 29 | 32 |
| | CFU/g wheat | | | |
| 0 | $3.4 \times 10^6$ | $3.4 \times 10^6$ | $3.4 \times 10^6$ | $3.4 \times 10^6$ |
| 4 | $2.3 \times 10^5$ | $2.1 \times 10^4$ | $2.7 \times 10^3$ | $1.4 \times 10^3$ |
| 8 | $2.9 \times 10^5$ | $6.1 \times 10^4$ | $2.0 \times 10^3$ | $5.2 \times 10^2$ |
| 12 | $4.8 \times 10^4$ | $2.1 \times 10^3$ | $3.7 \times 10^2$ | $8.0 \times 10^1$ |
| 24 | $4.7 \times 10^4$ | $1.4 \times 10^2$ | 5 | 5 |

As can be seen in Tables 3-6 and FIGS. 1-7, a three log reduction was achieved with several of the treatments. Table 10 shows the treatments that achieved a 3 log reduction within 4 hours. Table 11 shows the treatments that achieved a 3 log reduction within 8 hours. Table 12 shows the treatments that achieved a 3 log reduction within 12 hours. Table 13 shows the treatments that achieved a 3 log reduction within 24 hours.

TABLE 10

3 log reduction within 4 hours

| % lactic acid | Moles acid/g wheat | Incubation temperature (° F.) |
|---|---|---|
| 11.55% lactic acid | $6.06 \times 10^{-5}$ | 105 |
| 15.4% lactic acid | $8.08 \times 10^{-5}$ | 105 |
| 5.78% lactic acid | $3.01 \times 10^{-5}$ | 115 |
| 7.7% lactic acid | $4.03 \times 10^{-5}$ | 115 |
| 3.85% lactic acid | $2.02 \times 10^{-5}$ | 120 |
| 5.78% lactic acid | $3.01 \times 10^{-5}$ | 120 |
| 7.7% lactic acid | $4.03 \times 10^{-5}$ | 120 |
| 11.55% lactic acid | $6.06 \times 10^{-5}$ | 120 |

TABLE 11

3 log reduction within 8 hours

| % lactic acid | Moles acid/g wheat | Incubation temperature (° F.) |
|---|---|---|
| 7.7% lactic acid | $4.03 \times 10^{-5}$ | 110 |
| 5.78% lactic acid | $3.01 \times 10^{-5}$ | 115 |

TABLE 12

3 log reduction within 12 hours

| % lactic acid | Moles acid/g wheat | Incubation temperature (° F.) |
|---|---|---|
| 7.7% lactic acid | $4.03 \times 10^{-5}$ | 105 |
| 3.85% lactic acid | $2.02 \times 10^{-5}$ | 115 |
| water | 0 | 120 |

TABLE 13

3 log reduction within 24 hours

| % lactic acid | Moles acid/g wheat | Incubation temperature (° F.) |
|---|---|---|
| 15.4% lactic acid | $8.08 \times 10^{-5}$ | 70 |
| 7.7% lactic acid | $4.03 \times 10^{-5}$ | 100 |
| 3.85% lactic acid | $2.02 \times 10^{-5}$ | 105 |
| 5.78% lactic acid | $3.01 \times 10^{-5}$ | 105 |
| 3.85% lactic acid | $2.02 \times 10^{-5}$ | 110 |

Example 4—Accelerated Tempering

While performing testing described in Example 3, above, it was noted that a sample had experienced a drop in water activity within an hour of beginning incubation. Since a water activity drop can be an indicator of tempering quality, further experimentation was performed to determine whether tempering time could be accelerated.

In order to test the efficacy of accelerated tempering, wheat was treated with a preheat step followed by a 1 hour temper step at elevated temperature. Briefly, ambient temperature wheat was heated to a temperature of 125° F.±5° F. without the addition of a tempering solution. The preheated wheat was then transferred to a steam jacketed kettle and a lactic acid solution as a tempering solution was added at a temperature of 120° F.±10° F. to achieve a 15.5% wetted wheat moisture and a lactic acid concentration of 1.2 g per lb wheat ($2.94 \times 10^{-5}$ moles per gram wheat). The wheat and tempering solution was mixed at slow speed for 1 minute and transferred to a poly-lined 5 gallon pail and incubated at 125° F. A button temperature probe in the geometric center of the wheat in the pail was used to monitor temperature of the wheat. After an hour, the wheat was cooled in a glycol jacketed mixer to less than 80° F. The tempered wheat was milled either immediately after cooling or allowed to rest for 18 hours at ambient temperature following cooling. Milling performance and flour attributes of the tempered wheat, including attributes of dough made with the flour, were tested and compared to a control wheat sample that was treated identically, except that the wheat was not preheated, and the tempering was performed at ambient conditions overnight instead of heated conditions for 1 hour. The results of the milling performance and flour attributes are shown in Table 14.

TABLE 14

Milling performance and flour attributes

| Attribute | Control | One-hour heated temper — No ambient hold | One-hour heated temper — 18 hour ambient hold |
|---|---|---|---|
| Starting wheat moisture (%) | 10.53 | 10.53 | 10.53 |
| Starting wheat bulk density (kg/m³) | 828 | 828 | 828 |
| Bulk density tempered wheat prior to milling (kg/m³) | 750 | 780 | 782 |
| Moisture tempered wheat prior to milling (%) | 15.66 | 14.81 | Not measured |
| Milling yield (%) | 70.5 | 70.3 | 70.4 |
| Flour moisture (%) | 14.15 | 13.39 | 13.65 |
| Flour moisture - corrected BU (absorption) | 798 | 780 | 769 |
| Flour stability (W*hr/kg) | 20.8 | 17.3 | 19.2 |
| Flour-extensibility (mm) | 83 | 81 | 81 |
| Flour-Rmax (BU) | 749 | 734 | 748 |
| Flour-Area under curve (BU*mm) | 88 | 84 | 87 |

As can be seen in Table 14, the wheat tempered for 1 hour, and flour made therefrom, performed similarly to wheat tempered at ambient conditions overnight, and flour made therefrom.

Figure 8:
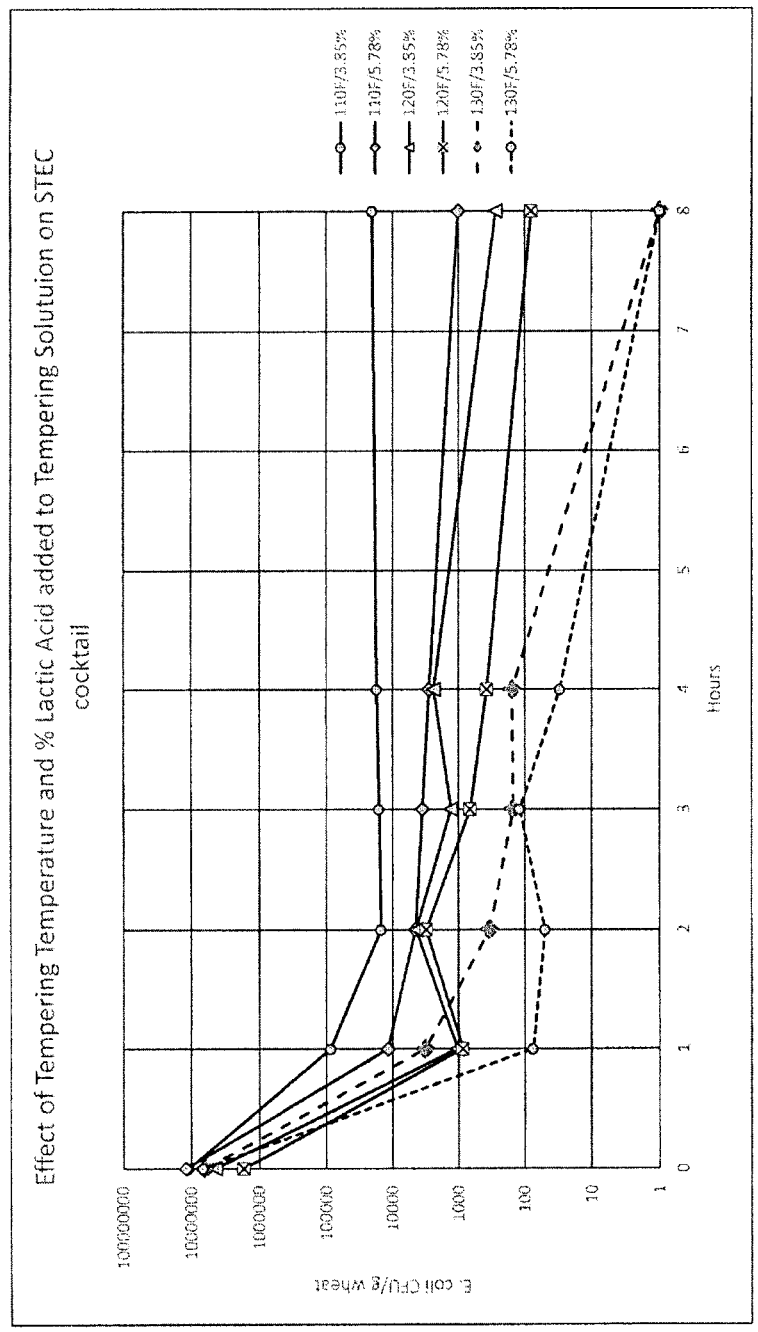
FIG. 8 shows a graph of STEC bacterial load as a function of time and organic acid concentration.
Figure 9:
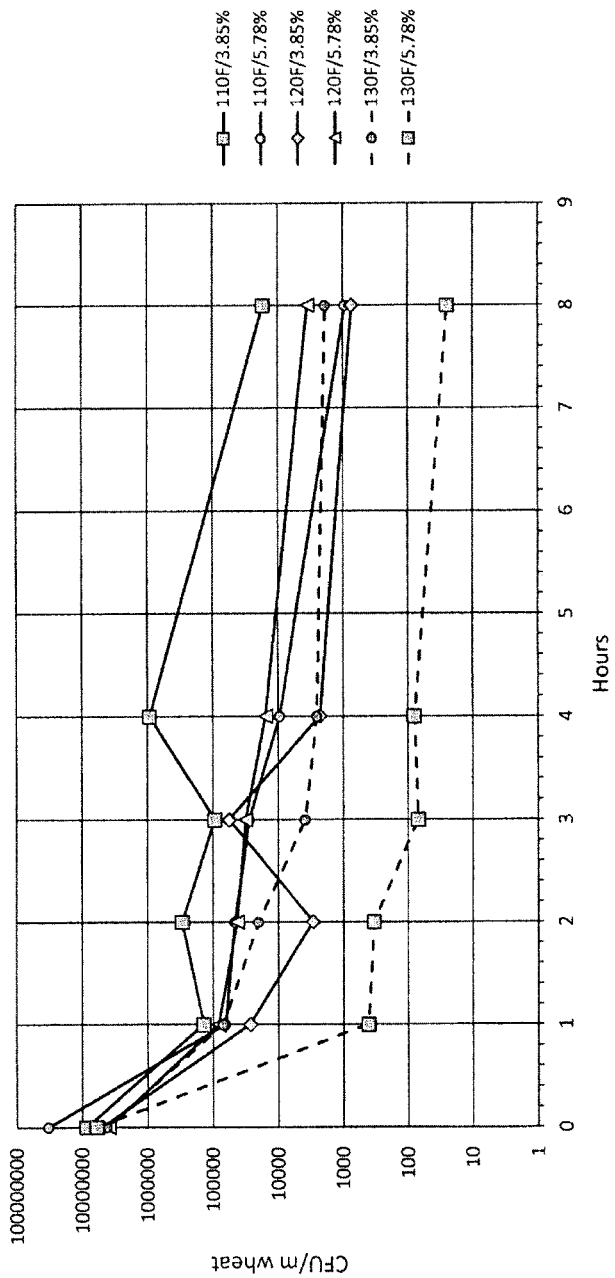
FIG. 9 shows a graph of *Salmonella* bacterial load as a function of time and organic acid concentration.

In order to determine whether accelerated temper conditions could be used to reduce bacterial load on a grain, inoculated grain with either STEC or *Salmonella* described in Example 1 was treated with a preheat step to 110° F., 120° F., and 130° F. and treated with tempering solutions containing 3.85% or 5.78% lactic acid, and the bacterial load was measured at timed intervals. Tables 15 and 16, graphed in FIGS. 8 and 9, respectively, show the results of the bacterial load over time.

TABLE 15

Bacterial load—STEC

| Time | 110° F. | | 120° F. | | 130° F. | |
|---|---|---|---|---|---|---|
| | Lactic acid concentration | | | | | |
| | 3.85% | 5.78% | 3.85% | 5.78% | 3.85% | 5.78% |
| | Bacterial Load | | | | | |
| 0 | $1.1 \times 10^7$ | $1.2 \times 10^7$ | $4.5 \times 10^6$ | $1.7 \times 10^6$ | $6.4 \times 10^6$ | $6.8 \times 10^6$ |
| 1 | $8.65 \times 10^4$ | $1.18 \times 10^{4**}$ | $1.05 \times 10^{3**}$ | $8.65 \times 10^{2**}$ | $3.18 \times 10^{3**}$ | $7.5 \times 10^{1\dagger}$ |
| 2 | $1.5 \times 10^{4**}$ | $4.55 \times 10^3$ | $4.4 \times 10^3$ | $3.1 \times 10^3$ | $3.4 \times 10^2$ | $5.0 \times 10^1$ |
| 3 | $1.62 \times 10^4$ | $3.55 \times 10^3$ | $1.31 \times 10^3$ | $6.7 \times 10^2$ | $1.5 \times 10^2$ | $1.2 \times 10^2$ |
| 4 | $1.75 \times 10^4$ | $2.8 \times 10^3$ | $2.4 \times 10^3$ | $3.75 \times 10^2$ | $1.55 \times 10^2$ | $3.0 \times 10^1$ |
| 8 | $2.05 \times 10^4$ | $1.03 \times 10^3$ | $2.75 \times 10^2$ | $8.0 \times 10^1$ | $1^\dagger$ | 1 |

** = 3 log reduction
† = 5 log reduction

TABLE 16

*Salmonella*

| Time | 110° F. | | 120° F. | | 130° F. | |
|---|---|---|---|---|---|---|
| | Lactic acid concentration | | | | | |
| | 3.85% | 5.78% | 3.85% | 5.78% | 3.85% | 5.78% |
| | Bacterial Load | | | | | |
| 0 | $8.7 \times 10^6$ | $3.3 \times 10^7$ | $5.0 \times 10^6$ | $4.0 \times 10^6$ | $4.3 \times 10^6$ | $6.1 \times 10^6$ |
| 1 | $1.4 \times 10^5$ | $6.5 \times 10^4$ | $2.7 \times 10^4$ | $8.2 \times 10^4$ | $7.0 \times 10^4$ | $4.25 \times 10^{2**}$ |
| 2 | $2.95 \times 10^5$ | $4.65 \times 10^4$ | $2.95 \times 10^3$ | $4.3 \times 10^4$ | $2.0 \times 10^4$ | $3.4 \times 10^2$ |
| 3 | $9.5 \times 10^4$ | $2.8 \times 10^{4**}$ | $5.67 \times 10^{4**}$ | $3.2 \times 10^4$ | $3.85 \times 10^{3**}$ | $7.0 \times 10^1$ |
| 4 | $9.2 \times 10^5$ | $9.5 \times 10^3$ | $2.3 \times 10^3$ | $1.57 \times 10^4$ | $2.55 \times 10^3$ | $8.0 \times 10^1$ |
| 8 | $1.7 \times 10^4$ | $9.5 \times 10^2$ | $7.45 \times 10^2$ | $3.55 \times 10^{3**}$ | $1.9 \times 10^3$ | $2.5 \times 10^{1\dagger}$ |

** = 3 log reduction
† = 5 log reduction

As can be seen in Table 15, STEC bacterial load can be reduced by at least 3 log within 1 to 2 hours (e.g., within 40 minutes) by preheating a grain followed by a heated tempering period with an organic acid solution. A 5 log reduction in STEC bacterial load can be seen within 1-8 hours at 130° F. Table 16 shows that *Salmonella* bacterial load can be reduced by 3 log within 2-8 hours at temperatures of 110° F. and above, and a 5 log reduction can be achieved within 8 hours at 130° F.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of tempering a grain, the method comprising:
    a. heating the grain in the absence of a tempering solution to a temperature of at least 115° F.,
    b. adding sufficient tempering solution to arrive at a moisture content of 12% to 20% to produce a tempering mixture, and
    c. incubating the tempering mixture at a temperature of least 70° F. for sufficient time to achieve a tempered grain, wherein:
        the tempering solution is an organic acid solution;
        the organic acid is lactic acid, peracetic acid, acetic acid, citric acid or salicylic acid; and
        the time is less than 24 hours.

2. The method of claim 1, wherein the heating step and incubating step are performed at a temperature of from 115° F. to 170° F.

3. The method of claim 1, further comprising a step of adjusting the temperature of the tempering solution to a temperature of within 5° F. the heated grain.

4. The method of claim 1, wherein the time is less than 6 hours.

5. The method of claim 4, wherein the time is less than 2 hours.

6. The method of claim 5, wherein the time is less than 30 minutes.

7. The method of claim 1, wherein the grain is wheat.

8. The method of claim 2, further comprising a step of adjusting the temperature of the tempering solution to a temperature of within 5° F. or the heated grain.

9. The method of claim 2, wherein the time is less than 6 hours.

10. The method of claim 9, wherein the time is less than 2 hours.

11. The method of claim 10, wherein the time is less than 30 minutes.

12. The method of claim 2, wherein the grain is wheat.

13. The method of claim 1, wherein the organic acid is lactic acid.

14. The method of claim 1, wherein the organic acid is included in the tempering solution in an amount sufficient to provide an organic acid content of at least about $2\times10_{-5}$ moles per gram grain.

15. The method of claim 1, wherein the tempering solution has a concentration of organic acid of from 1.5% to 15%.

16. The method of claim 1, wherein the tempering mixture is incubated to provide at least a 2 log reduction in an inoculated grain of the same type.

* * * * *